United States Patent [19]
Huang et al.

[11] Patent Number: 5,588,331
[45] Date of Patent: Dec. 31, 1996

[54] ROTARY SHIFTER FOR BICYCLE

[75] Inventors: Jack Huang, Tainan; Chung-Ping Chiang, Kaohsiung; Chan-Hua Feng, Hsinchu, all of Taiwan

[73] Assignee: Industrial Technology Research Institute, Hsinchu Hsien, Taiwan

[21] Appl. No.: 407,565

[22] Filed: Mar. 21, 1995

[51] Int. Cl.$^6$ .............................. F16C 1/10; G05G 11/00
[52] U.S. Cl. .................. 74/489; 74/475; 74/502.2
[58] Field of Search .................. 74/475, 489, 502.2, 74/504, 57

[56] References Cited

U.S. PATENT DOCUMENTS

| | | | |
|---|---|---|---|
| 1,281,043 | 10/1918 | Magner | 74/489 |
| 1,511,261 | 10/1924 | Brown | 74/489 |
| 1,556,411 | 10/1925 | Brown | 74/489 |
| 1,834,724 | 12/1931 | Nisbet | 74/489 |
| 4,019,402 | 4/1977 | Leonheart | 74/489 |
| 4,744,265 | 5/1988 | Nagano | 74/475 X |

FOREIGN PATENT DOCUMENTS

| | | | |
|---|---|---|---|
| 829283 | 11/1937 | France | 74/489 |
| 461222 | 9/1951 | Italy | 74/489 |
| 561377 | 4/1957 | Italy | 74/489 |
| 6-99876 | 4/1994 | Japan | 74/502.2 |
| 225312 | 12/1924 | United Kingdom | 74/489 |

*Primary Examiner*—Charles A. Marmor
*Assistant Examiner*—Troy Grabow
*Attorney, Agent, or Firm*—W. Wayne Liauh

[57] ABSTRACT

This invention relates to a rotary shifter of a bicycle including: a fixing seat mounted on the handlebar of the bicycle; a rotary lever mounted on the fixing seat on an identical shaft axis as the handlebar; a drag member for driving a derailleur cable to enable a derailleur to change gears; a limit member for driving the drag member to engage in linear movement within a specific stroke; a rotary member for being driven by the rotary lever; a screw driving member located on the rotary member for driving the drag member to engage in linear movement along the specific stroke; a locating mechanism for locating the rotary member at an angular position corresponding to each gear of the derailleur; and an over shift device for enabling the drag member to produce extra displacement necessary for over shift of the derailleur to change gears.

11 Claims, 9 Drawing Sheets

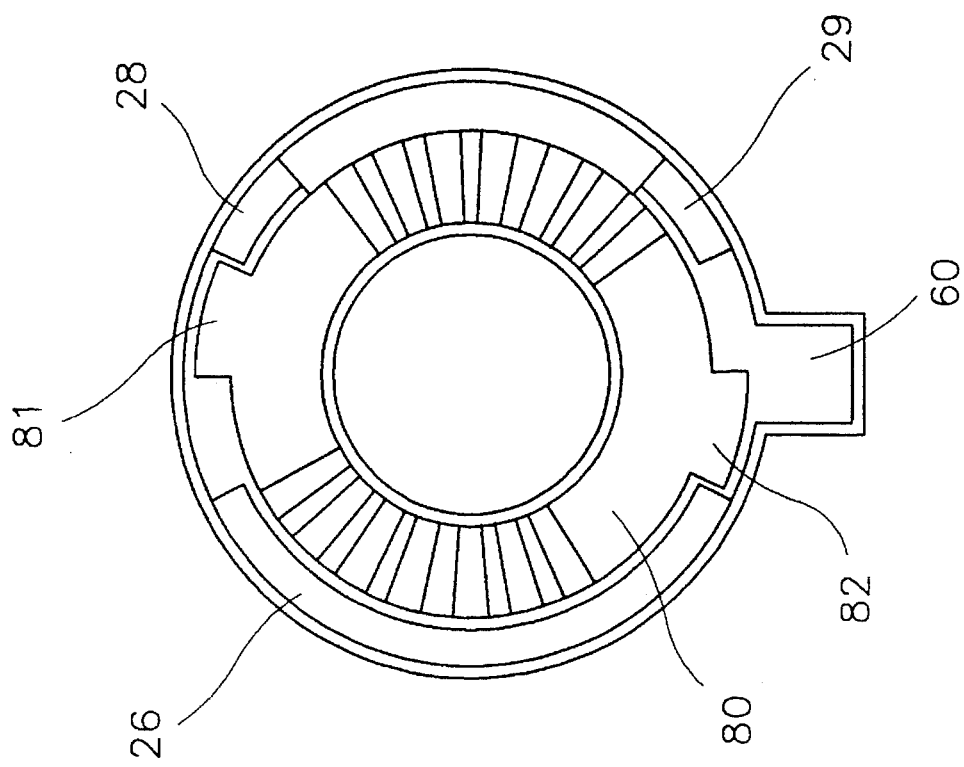
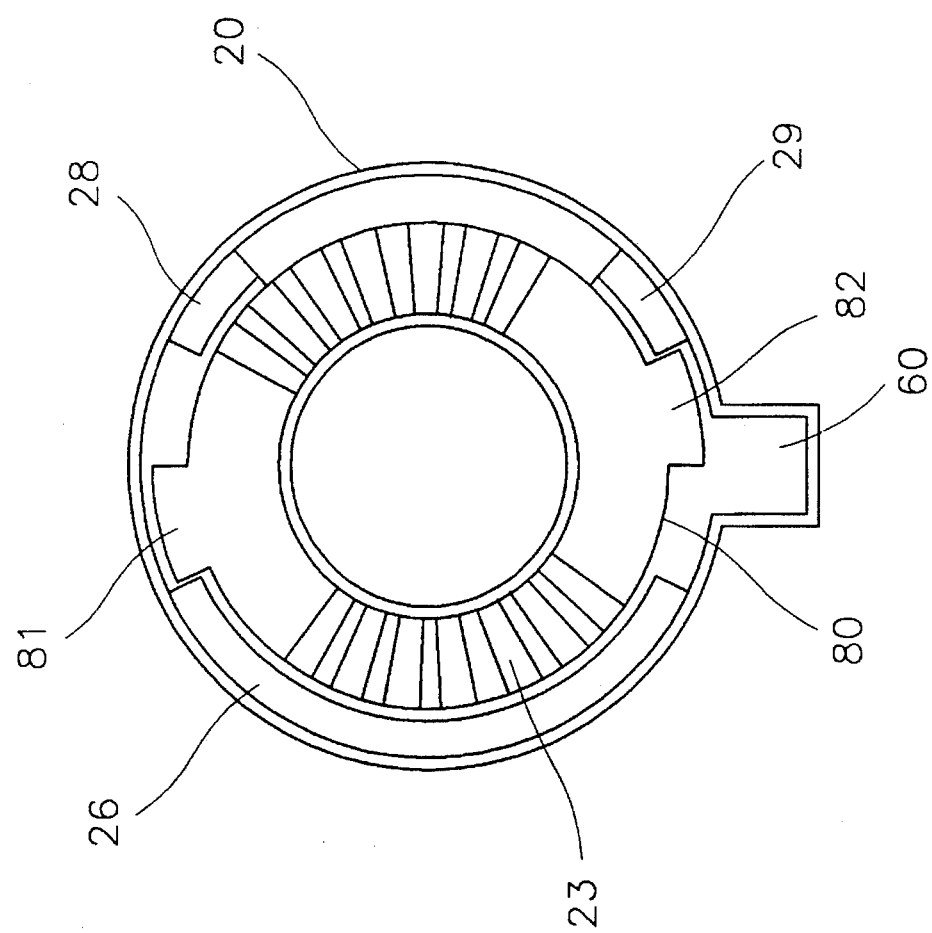

5,588,331

ROTARY SHIFTER FOR BICYCLE

FIELD OF THE INVENTION

This invention relates to a gear-shifting mechanism for bicycles, and particularly to the changing of gears by means of a rotary shifter to cause linear extension of the derailleur cable.

BACKGROUND OF THE INVENTION

The prior invention relates to devices for operating the gear change of a bicycle. In general, this device is a lever type shifter, and the user may push the lever of the shifter for winding the cable of the derailleur to tighten or relax it. An index device is used for telling the extension of the cable subject to different shifts so as to drive the rear derailleur for the change to each gear.

In the course of gear change of the derailleur, because of the lash between the gear and the chain and the relaxation of the cable, errors in the derailleur shift would occur so that the derailleur gear drives the chain to move another distance of stroke in order to allow the chain to set into the right shift of the gear cluster. Then, the derailleur gear will return to the right position. The extra stroke necessary for keeping the shifting correct is called "over shift," which may prevent the derailleur from being affected by errors, while keeping the operation correct as well as ensuring the operation to be correct for as long as it is used.

The major defects of the lever type shifter include:

1. Complexity of the operation—the rider has to push the shifter with his or her thumb and index finger in order to change gears while he or she is paying attention to steering the bicycle and the brake function. Manipulation and safety of riding has thus been reduced;

2. Low efficiency of the cable—because the cable is winding around the disc, its transmission efficiency would be reduced to cause labor waste for operation due to stress concentration, fatigue destruction, and arc winding;

3. To improve the aforesaid operating problems, some of the shifters have adopted ratchet mechanisms for governing the shift, but that increases the number of parts, the cost, and assembly work load;

4. To attain the purpose of the over shift, the shifter has to add an over shift device.

Referring to FIG. 1, the conventional rotary shifter includes a fixing seat 1 mounted on the handlebar of a bicycle, and a rotary lever 2 with an identical shaft center to the handlebar for the rider to hold and manipulate with his or her palm. With the rotation of lever 2, it drives the derailleur cable 3 to drive the derailleur to change the shift. The fixing seat 1 and lever 2 can be mounted on the handlebar near the area between the thumb and the index finger of the rider so that the rider may hold the handlebar and the lever 2. The rider may then change the gear without leaving his or her palm from the handlebar. However, the action of the conventional rotary shifter remains for using the winding way to drive the cable so that the operating efficiency is not high, and besides, the cable is liable to fatigue and fracture. In addition, the derailleur cable 3 of such type has to be specially winding around the actuator, which is very difficult to assemble. Further, to attain the purpose of over shift, the conventional rotary shifter requires an over shift device.

SUMMARY OF THE INVENTION

One object of this invention is to provide a rotary shifter for driving the cable by means of linear movement in order to increase the operating efficiency while avoiding cable fatigue and fracture.

Another object of this invention is to provide a rotary shifter which is easy and labor-saving in operation.

Still another object of this invention is to provide a rotary shifter which is simple in structure and easy to assemble.

BRIEF DESCRIPTION OF THE DRAWING

FIGS. 11 and 12 are a diagrammatic view showing the action of over shift device of FIG. 10.

DETAILED DESCRIPTION OF PREFERRED EMBODIMENTS

Figure 1:
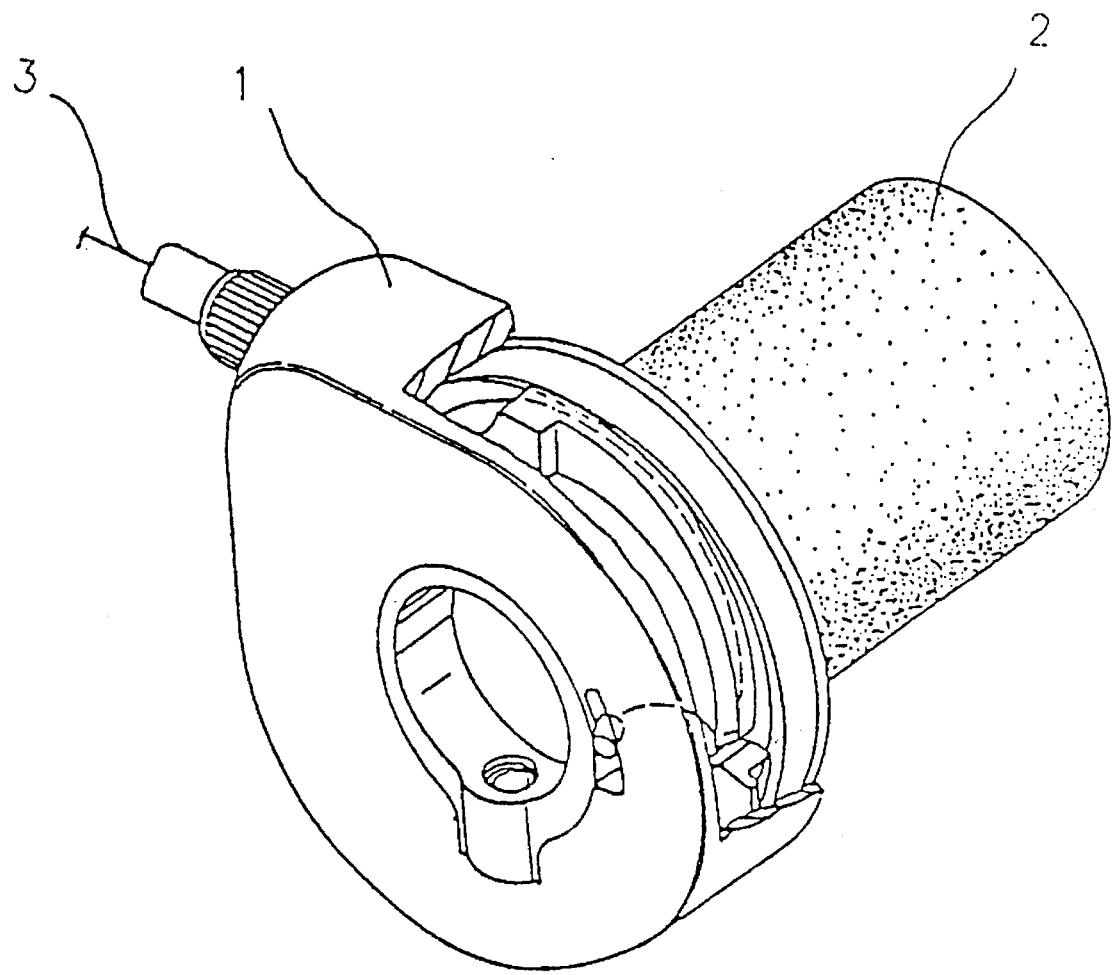
FIG. 1 is an elevational view of the conventional rotary shifter.
Figure 2:
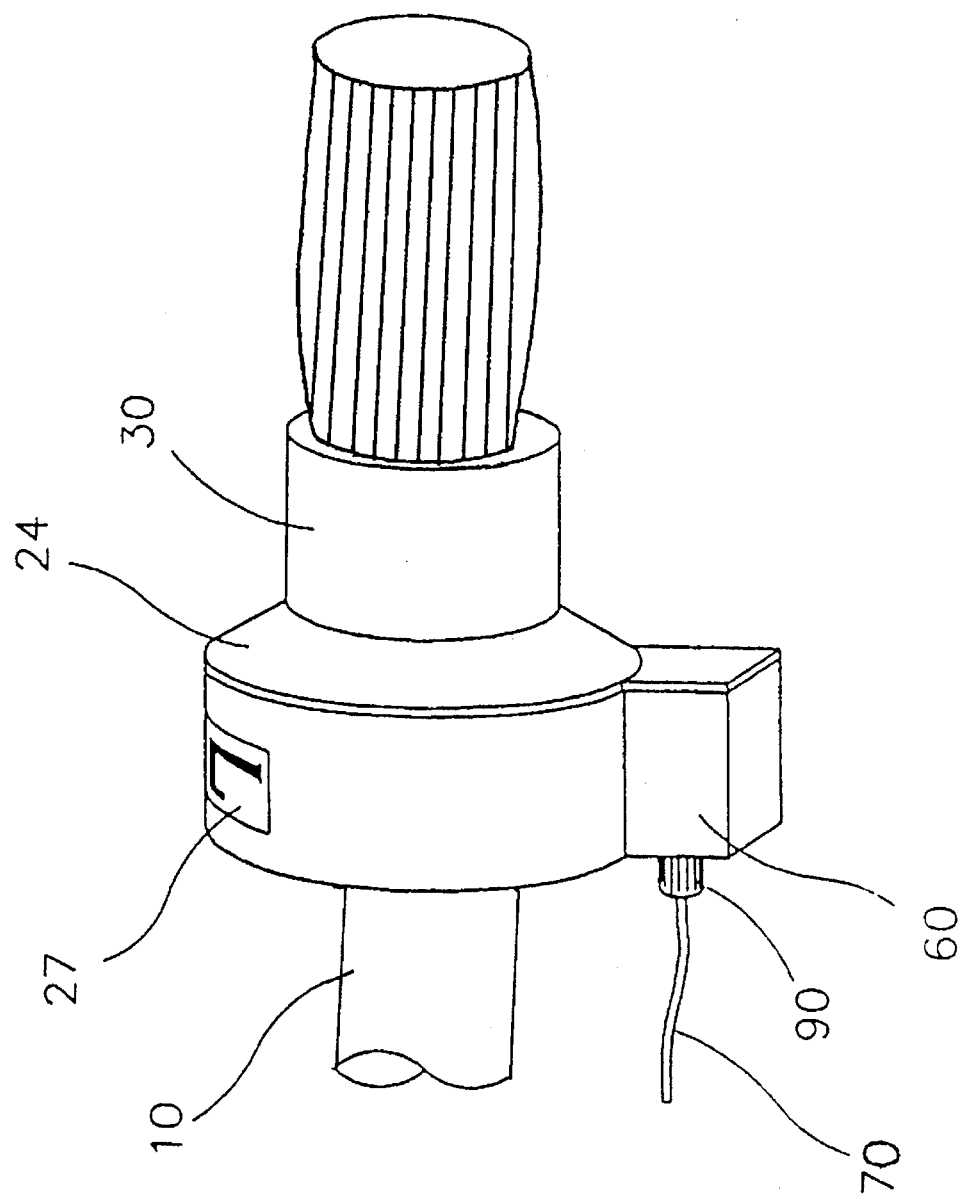
FIG. 2 is an elevational view showing the assembly of the present invention.
Figure 3:
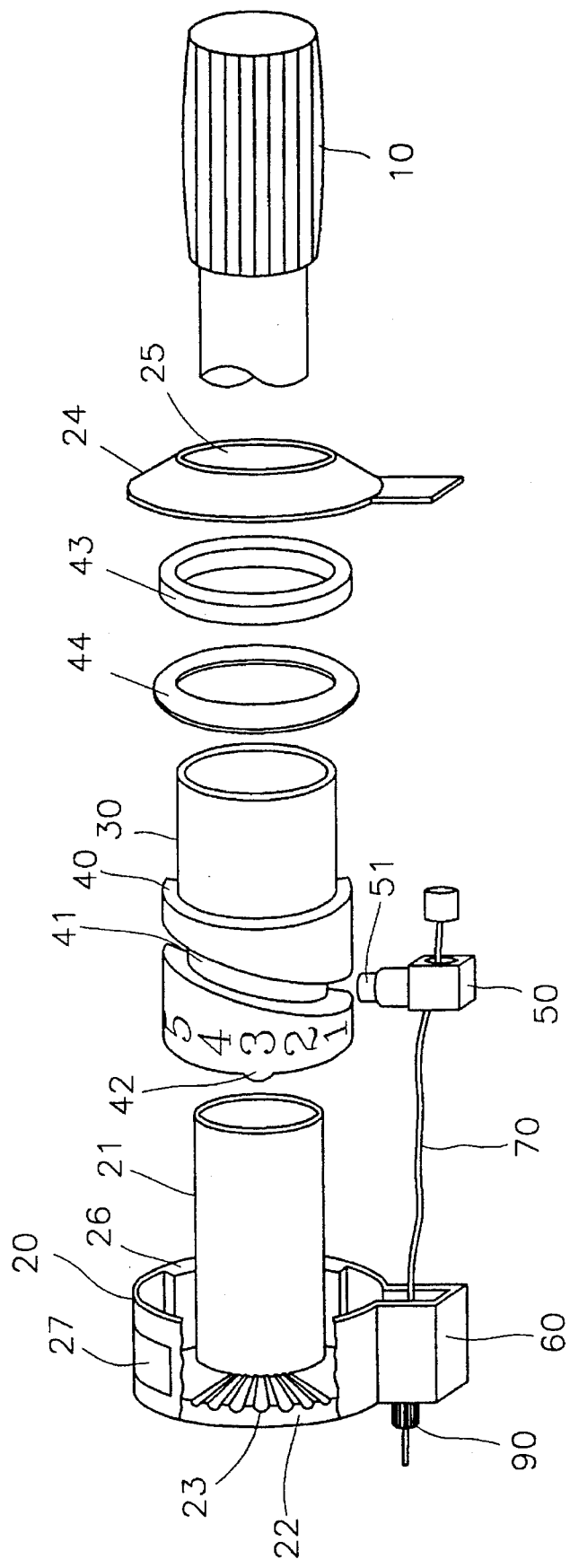
FIG. 3 is an exploded view of the present invention.

Referring to FIGS. 2 and 3, the present rotary shifter comprises a fixing seat 20 mounted on the handlebar 10 of a bicycle, a rotary lever 30 with an identical shaft center to the handlebar 10, and a rotary member 40 to be driven by the rotary lever 30, a drag member 50 which may be engaged in linear movement when driven by rotary member 40, and a limit member 60 for guiding drag member 50.

Referring to FIG. 3, the center of fixing seat 20 is extended with a sleeve 21 axially along handlebar 10 for mounting on handlebar 10, and sleeve 21 allows rotary member 40 and rotary lever 30 to mount thereon. The fixing seat 20 resembles a short drum with one end opening for rotary member 40 to be fully mounted therein, fixing seat 20 has one closed end 22, and the inner side of closed end 22 may contact with the end of rotary member 40, and on the inner side of closed end 22 has a proper number of locating slots 23 for locating rotary member 40 at the angle position of each gear (to be described in later paragraph).

Figure 4:
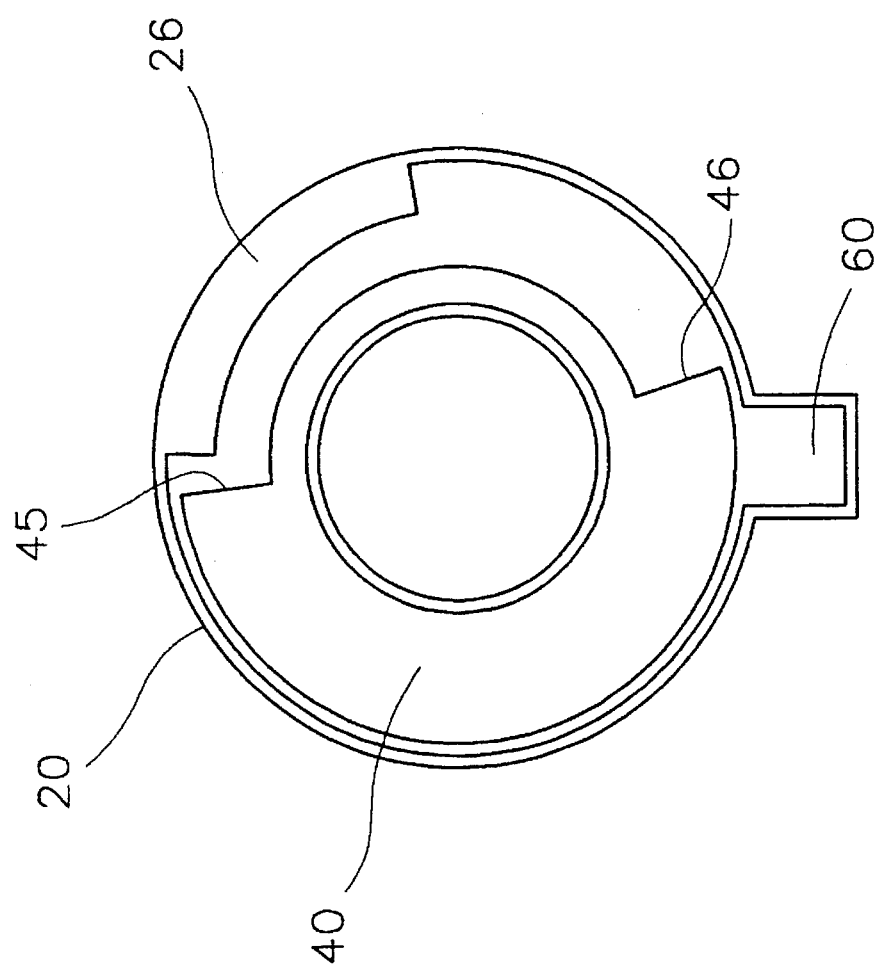
FIG. 4 is an elevational-sectional view showing the fixing seat and rotary members of the present invention.

Referring to FIGS. 3 and 4, rotary member 40 has a column side which has a screw driving member 41. On the end of the column side contacting the closed end of fixing seat 20 is a key 42 for fitting locating slots 23. The rotary member 40 and rotary lever 30 are joined as one body and mounted on sleeve 21, and therefore when the rider rotates rotary lever 30, it drives rotary member 40 to turn around the handlebar 10 at the shaft center. When rotary member 20 is placed in fixing seat 20, a cover 24 is used for sealing the opening end of fixing seat 20 to limit rotary member 40 from breaking away from fixing seat 20. On the center of cover 24 is a hole 25. The diameter of hole 25 is greater than rotary lever 30 so that rotary lever 30 may extend through cover 24.

An elastic member 43 and a washer 44 are located between cover 24 and rotary member 40. With elastic member 43 engaging pressure upon rotary member 40, it enables the end of rotary member 40 to hold down to the inner side of the closed end of fixing seat 20.

Referring to FIG. 4, rotary member 40 has one side resembling an incomplete circle with a slot, and both sides of the slot part resemble flat shoulders 45, 46. The inner wall of fixing seat 20 has a locating block 26 for fitting into the slot part of rotary member 40. The locating block 26 has a width smaller than the width of the slot part of rotary member 40. When the shoulders 45, 46 of rotary member 40 is held against block 26, it can not rotate any more and screw driving member 41 of rotary member 40 also are moved to the start or end point of the stroke so that it may prevent rotary member 40 from excessive rotation over the range of stroke for screw driving member 41.

Under fixing seat 20 is a guide member 60. The guide member 60 is a square slot integrally molded with fixing seat 20, and guide member 60 may accommodate drag member 50, and limits it to linear movement only, and may allow a derailleur cable 70 to penetrate in connection to drag member 50.

The drag member 50 can be driven by screw driving member 41 for reciprocal movement within a specific stroke. Referring to FIG. 3, screw driving member 41 is a cam slot, therefore drag member 50 has a cam follower 51 thereon for fitting into the screw driving member 41 of rotary member 40. When rotary member 40 is in rotation, cam follower 51 will be driven by rotary member 41, and therefore drives drag member 50 in linear movement reciprocally along guide member 60 so that cable 70 produces a variety of extension due to the drive of drag member 50 so as to control the gear change of the derailleur.

Figure 5:
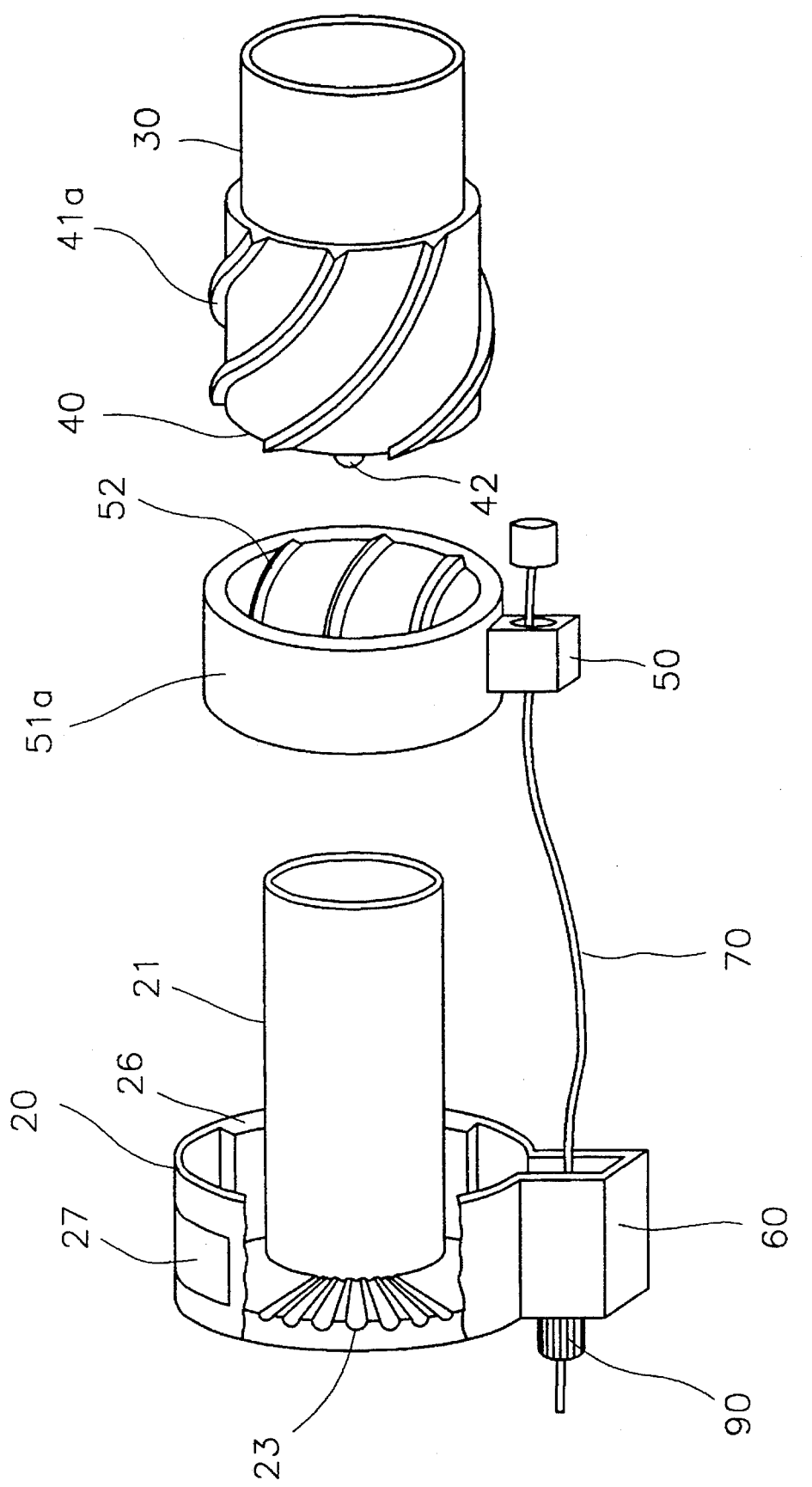
FIG. 5 is an elevational view showing screw drive member of the first embodiment of the present invention.
Figure 6:
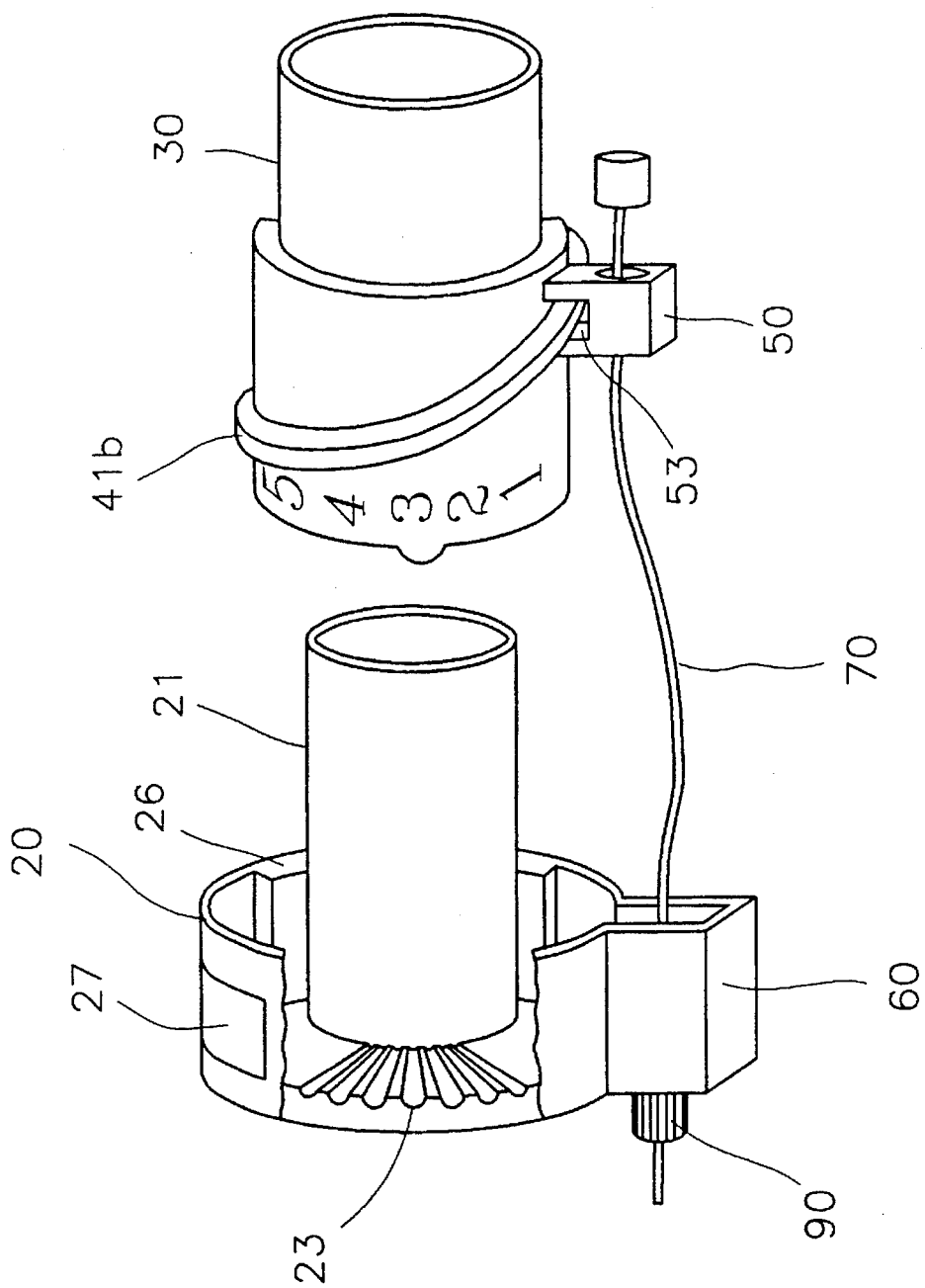
FIG. 6 is an elevational view showing screw drive member of another embodiment of the present invention.

Referring to FIG. 5, the surface of rotary member 40 has a male thread 4 la, and on drag member 50 is a follower 5 la for fitting with rotary member 40. In follower 5 la, there is a female thread 52 for fitting male thread 41a so that when rotary member 40 is in rotation, follower 51a and drag member 50 will be driven to produce reciprocal displacement. Referring to FIG. 6, the screw driving member on rotary member 40 is changed into a screw projection 4 lb. Then, on drag member 50 is a groove 53 fitting with screw projection 41b so that drag member 50 can be joined with rotary member 40.

Figure 9:
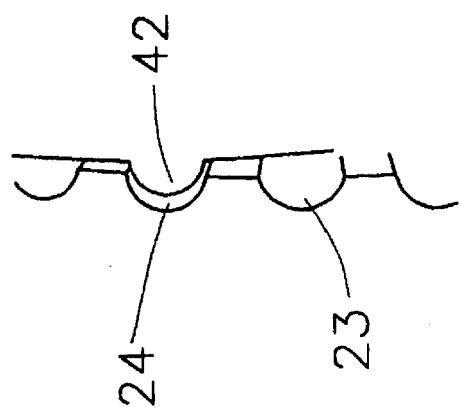
FIGS. 7 thru 9 are a diagrammatic view showing the structure and action of over shift device of the present invention.
Figure 8:
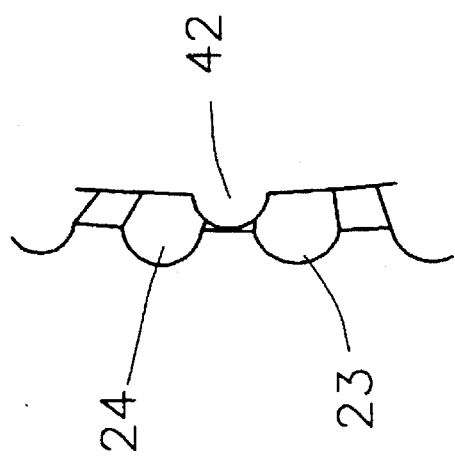
Figure 7:
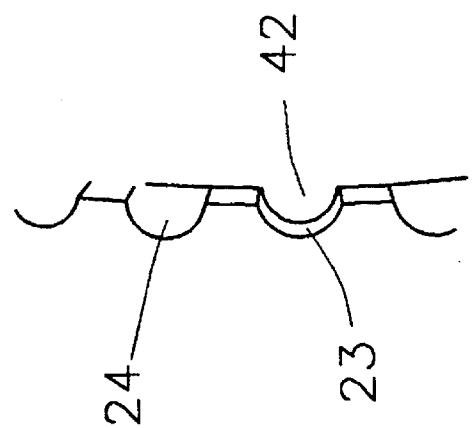

The locating slot 23 on the inner side of closed end 22 of fixing seat 20 is to fit the key 42 on the end of rotary member 40 for locating on the angle corresponding to respective gears of the derailleur and accurate location is accomplished thereof. In addition, locating slot 23 and key 42 may also provide over shift necessary for gear change. Referring to FIGS. 7 thru 9, when rotary member 40 has changed to another gear from the present gear. Key 42 must depart from the locating slot 23 retained by the present gear, key 42 will thus be propped up to some distance (FIG. 8) so that rotary member 40 and drag member 50 will produce a small amount of displacement, and therefore drives the cable 70 to produce over shift as necessary. When rotary member 40 has turned to the gear change as desired, rotary member 40 will be thrusted by the resilience of elastic member 43 so that the key 42 will be automatically fitted into the locating slot 24 of the gear (FIG. 9) so that extra extension of derailleur cable is thus eliminated while returning to the position of the right shift.

Figure 10:
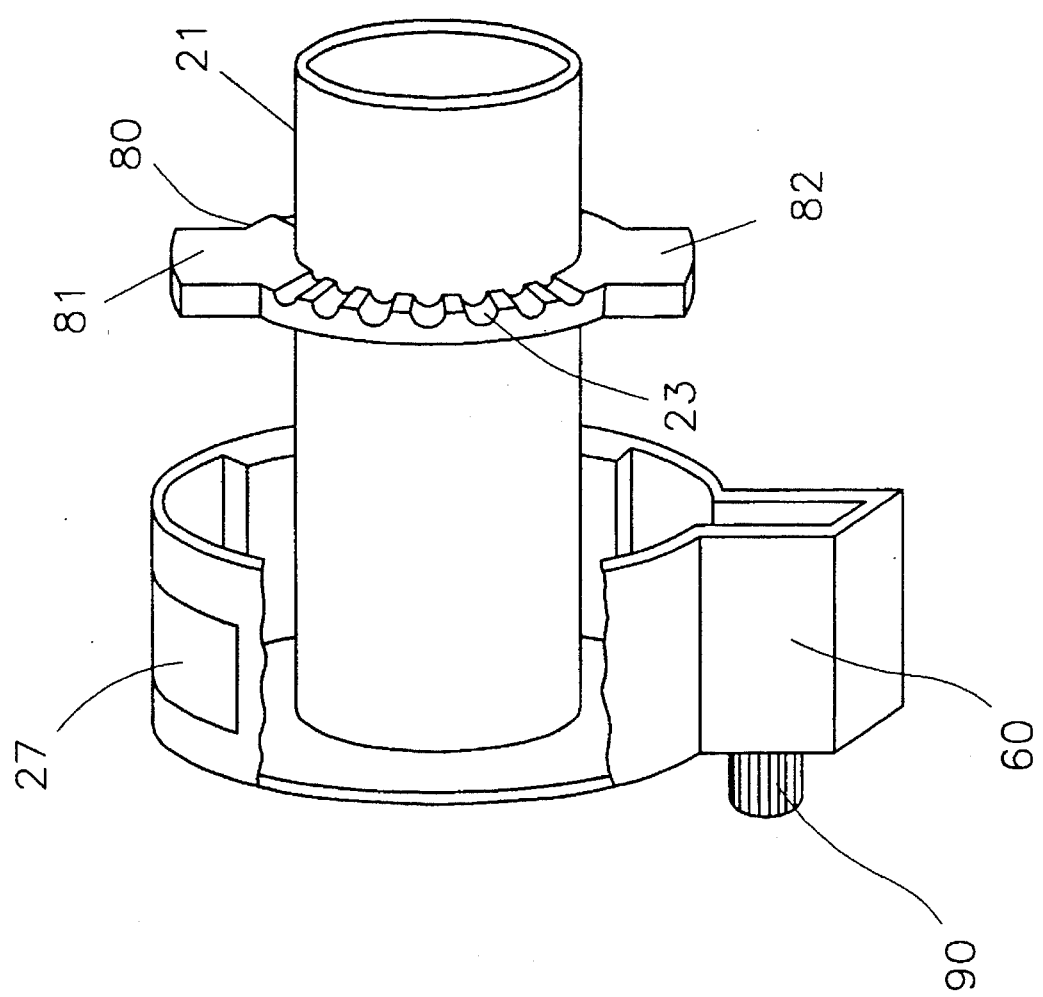
FIG. 10 is an elevational view showing over shift device of another embodiment of the present invention.

Referring to FIGS. 10, 11, and 12, fixing seat 20 is added on a locating plate 80, and locating slot 23 is mounted on locating plate 80. The locating plate 80 is rotatably mounted on the sleeve of fixing seat 20, and sidewise extending with two stoppers 81, 82, and two locating blocks 28, 29 are added in fixing seat 20. Two grooves, slightly wider than two stoppers 81, 82, are formed beside locating blocks 28, 29 and locating block 26, and stoppers 81, 82 of locating plate 80 may be fitted into the groove and are movable within a range of a small angle so that the fitting of locating blocks 26, 28, 29 with stoppers 81, 82 may limit locating plate 80 to rotate within an angle range.

When the rider turns rotary member 40, rotary member 40 will drive locating plate 80 in rotation so that there is no relative rotation between rotary member 40 and locating plate 80. When locating plate 80 turns to the end point of the range, locating plate 80 can not rotate any more so that relative rotation will occur between rotary member 40 and locating plate 80 while enabling the key 42 of rotary member 40 to depart from the locating slot 24 of the present shift and to fit into the locating member 24 of the next shift.

The range of rotary angle for locating plate 80 may provide extra rotation necessary for over shift produced by rotary member 40 so that rotary member 40 will turn at an extra angle before shifting to the correct gear while enabling the derailleur cable to produce extra extension of over shift. Upon completion of gear change, locating plate 80 will return to the start position as shown on FIG. 11 so that rotary member 40 and drag member 50 may return to the position of right shift.

As locating plate 80 may provide displacement necessary for a greater over shift, varied embodiments can be applied to the derailleur that requires a greater over shift.

When the present derailleur is in operation, the user does not need to release the handlebar 10 but may turn rotary lever 30 for gear change, making it very easy to operate while not affecting the safety of the rider manipulating the bicycle. The most outstanding characteristic of the present invention lies in rotary member 40 driving drag member 50 to produce linear movement to drive the derailleur cable 70 for gear change so that derailleur cable 70 can be extensible in a linear manner to avoid efficiency loss due to cable winding and therefore to prolong its life span.

The location means of the present rotary member 40 may ensure right location of each gear, and further may provide over shift so that the present invention has no need of adding an over shift device. Furthermore, the present invention has a fewer number of components than the conventional shifter, and it is very easy to assemble the various components so that the present invention is effective in reducing the cost and making it easy to assemble.

We claim:

1. A rotary shifter for use with a bicycle for driving a derailleur cable to be engaged with a predetermined gear among a plurality of gears, comprising:

(a) a fixing seat mounted on a handlebar of said bicycle;

(b) a drag member for driving the derailleur cable to produce an extension thereof in response to a predetermined stroke exerted by a bicycle rider;

(c) a limit member mounted on said fixing seat for limiting said drag member to move within said predetermined stroke; and (d) a rotary member which is mounted on said handlebar of said bicycle and is capable of rotating around an axial direction of said handlebar, said rotation of said rotary member enables a screw driving member to drive said drag member in axial movement, said screw driving member is mounted on said rotary member, such that a rotation of said rotary member causes said screw driving member to rotate, which drives said drag member to move within said stroke, and which in turn drives the derailleur cable to cause the change of engagement of the derailleur to another predetermined gear;

(e) wherein one end of said rotary member is provided with a washer, said washer is connected to a spring member while thrusting against a cover plate, and said cover plate is connected to said fixing seat so as to enable said rotary member to be limited to a specific location of said fixing seat.

2. The rotary shifter for use with a bicycle as claimed in claim 1 further includes a locating mechanism mounted on said rotary member for locating said rotary member on an angle position corresponding to respective gears of to which the derailleur is engaged.

3. The rotary shifter for use with a bicycle as claimed in claim 2 wherein said locating mechanism has locating slots and keys on a contact plane between the end of said rotary member and fixing seat to limit said rotary member to fit at a specific angle.

4. The rotary shifter for use with a bicycle as claimed in claim 2 wherein said screw driving member provides male thread on its surface, and said drag member provides female thread to fit it.

5. The rotary shifter for use with a bicycle as claimed in claim 4 wherein said rotary member drives said drag member by means of thread joint.

6. The rotary shifter for use with a bicycle as claimed in claim 1 wherein said screw driving member has a cam slot on the surface of said rotary member for driving said drive member.

7. The rotary shifter for use with a bicycle as claimed in claim 1 wherein said screw driving member has a screw projection on the surface of said rotary member, and said drag member has a groove for accommodation.

8. The rotary shifter for use with a bicycle as claimed in claim 1 wherein said fixing seat is cut with a display window and said screw member has a plurality of digits on the display window each digit being corresponding to a respective gear.

9. The rotary shifter for use with a bicycle as claimed in claim 1 further includes an over shift device for driving said drag member and enabling said drag member to engage in reciprocal movement at a specific distance in order to produce an extra displacement necessary for gear change.

10. The rotary shifter for use with a bicycle as claimed in claim 9 wherein said locating mechanism and said over shift device are combined as one integrated device.

11. The rotary shifter for use with a bicycle as claimed in claim 9 wherein said over shift device further includes:

(a) a locating plate for winding around said rotary member and accommodating a limit device of said fixing seat;

(b) a limit device mounted on said fixing seat for limiting said locating plate to engage in reciprocal rotation at said specific angle; and (c) a locating mechanism mounted on a connection plane between said locating plate and said rotary member; whereby when said rotary member is to change gears, said rotary member will first drive said locating plate in rotation to produce extra displacement necessary for one gear change.

\* \* \* \* \*